United States Patent
Tseng

(10) Patent No.: US 10,841,387 B2
(45) Date of Patent: *Nov. 17, 2020

(54) PREFERRED CONTACT CHANNEL FOR USER COMMUNICATIONS

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,746

(22) Filed: Jul. 26, 2019

(65) Prior Publication Data

US 2019/0349442 A1 Nov. 14, 2019

Related U.S. Application Data

(63) Continuation of application No. 15/896,893, filed on Feb. 14, 2018, now Pat. No. 10,397,351, which is a continuation of application No. 14/539,019, filed on Nov. 12, 2014, now Pat. No. 9,917,909, which is a continuation of application No. 14/192,443, filed on Feb. 27, 2014, now Pat. No. 8,914,442, which is a continuation of application No. 12/900,400, filed on Oct. 7, 2010, now Pat. No. 8,719,368.

(51) Int. Cl.
*H04L 29/08* (2006.01)
*G06Q 10/10* (2012.01)
*G06Q 50/00* (2012.01)

(52) U.S. Cl.
CPC .......... *H04L 67/22* (2013.01); *G06Q 10/101* (2013.01); *G06Q 10/107* (2013.01); *G06Q 50/01* (2013.01)

(58) Field of Classification Search
CPC ......... H04L 29/08072; H04L 29/06027; H04L 12/581; H04L 67/22; H04L 29/06; G06Q 10/10; G06Q 10/107; G06Q 10/101
USPC ........................................................ 709/204
See application file for complete search history.

(56) References Cited

U.S. PATENT DOCUMENTS

| | | | |
|---|---|---|---|
| 2007/0271232 A1* | 11/2007 | Mattox | G06Q 50/01 |
| 2008/0133605 A1* | 6/2008 | MacVarish | G06Q 10/10 |
| 2009/0029674 A1* | 1/2009 | Brezina | H04M 15/00 455/405 |
| 2010/0241634 A1* | 9/2010 | Madhok | G06Q 10/107 707/748 |

* cited by examiner

*Primary Examiner* — Tauqir Hussain
(74) *Attorney, Agent, or Firm* — Baker Botts L.L.P.

(57) ABSTRACT

In one embodiment, a method includes sending a request from a first user for communication-channel information associated with a second user to a computing device, and receiving one or more user-selectable elements corresponding to each communication channel of a plurality of communication channels from the computing device, wherein the plurality of communication channels are determined based on an affiliation coefficient between the first user and the second user, wherein each communication channel is associated with a score calculated based on a social proximity between the first user and the second user, and wherein the one or more user-selectable elements corresponding to each communication channel of the plurality of communication channels are presented in an order ranked based on the respective score associated with the communication channel.

20 Claims, 6 Drawing Sheets

| presentation sequence | contacts group | 1st | 2nd | 3rd | 4th | 5th |
|---|---|---|---|---|---|---|
| PS1 | family | chat | call | SMS | email | IM |
| PS2 | friends | SMS | IM | call | email | chat |
| PS3 | others | email | IM | chat | SMS | call |

FIGURE 3

| PS1 | weighting factor | chat | call | SMS | email | IM |
|---|---|---|---|---|---|---|
| default | 0.5 | 1.0 | 0.8 | 0.6 | 0.4 | 0.2 |
| outbound | 0.3 | 10% | 45% | 5% | 40% | 0% |
| inbound | 0.2 | 10% | 55% | 5% | 30% | 0% |
| weighted average | | 0.55 | 0.65 | 0.33 | 0.38 | 0.10 |

301

| social groups | 1st | 2nd | 3rd | 4th | 5th |
|---|---|---|---|---|---|
| PS1 | call | chat | email | SMS | IM |
| PS2 | SMS | IM | call | email | chat |
| PS3 | email | IM | chat | SMS | call |

302

PREFERRED CONTACT CHANNEL FOR USER COMMUNICATIONS

PRIORITY

This application is a continuation under 35 U.S.C. § 120 of U.S. patent application Ser. No. 15/896,893, filed 14 Feb. 2018, which is a continuation under 35 U.S.C. § 120 of U.S. patent application Ser. No. 14/539,019, filed 12 Nov. 2014, which is a continuation under 35 U.S.C. § 120 of U.S. patent application Ser. No. 14/192,443, filed 27 Feb. 2014, which is a continuation under 35 U.S.C. § 120 of U.S. patent application Ser. No. 12/900,400, filed 7 Oct. 2010, each of which is incorporated herein by reference.

TECHNICAL FIELD

The present disclosure relates generally to a network communications services and, more particularly, to ranking communication channels of contacts in a user's address book based on social graph information and communication history.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. For example, a user of a social networking website can access an address book stored in the social networking website, look up a contact in the address book and connect with the contact through email.

SUMMARY OF PARTICULAR EMBODIMENTS

Particular embodiments relate to ranking and/or selecting preferred communication channels for target users based on social graph information and communication history. These and other features, aspects, and advantages of the disclosure are described in more detail below in the detailed description and in conjunction with the following figures.

BRIEF DESCRIPTION OF THE DRAWINGS

FIG. 2A illustrates an example of presentation sequences based on social proximity.

FIG. 3 illustrates an example of updating a presentation sequence based on inbound and outbound communication history.

DESCRIPTION OF EXAMPLE EMBODIMENTS

Figure 1:
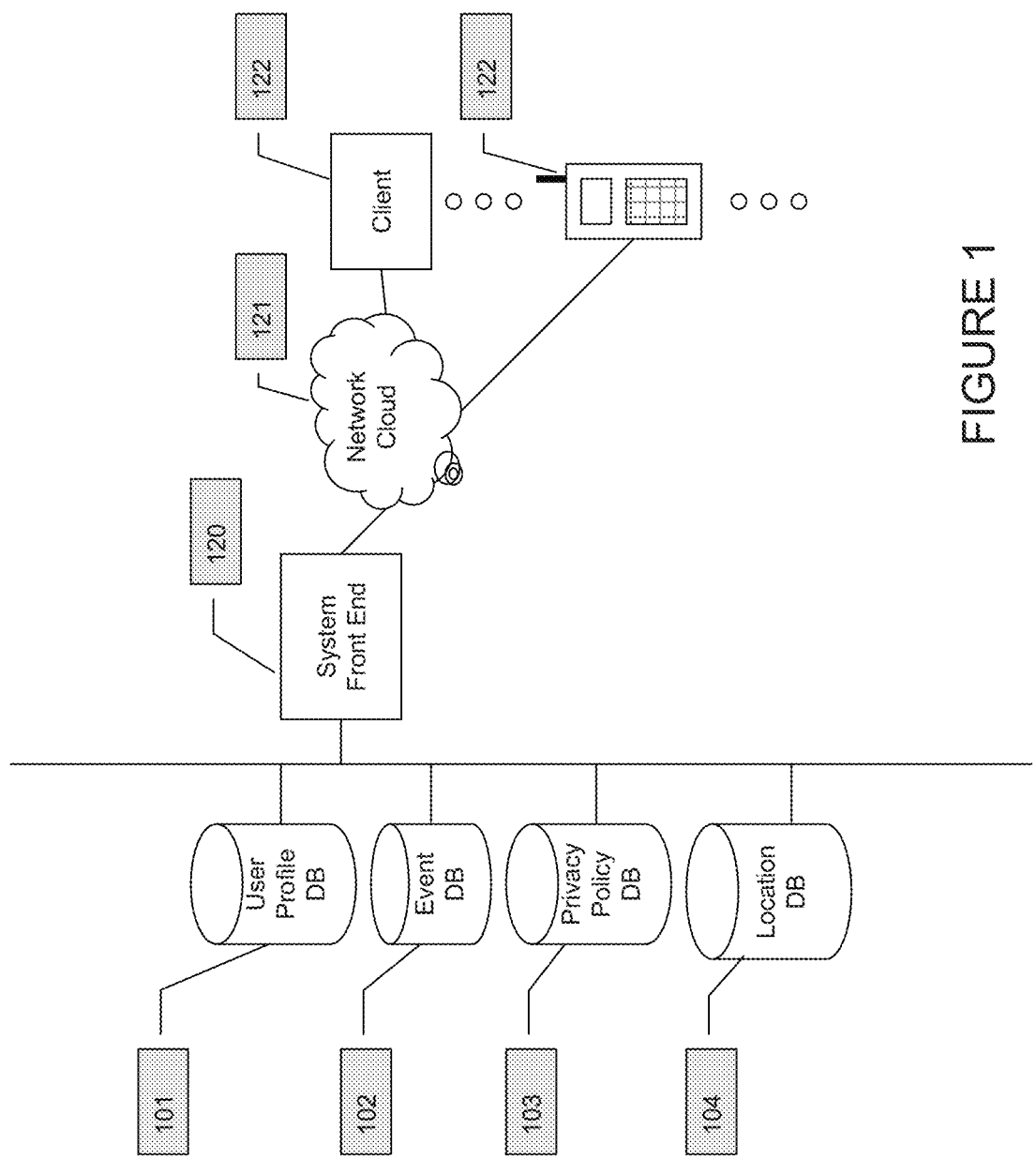
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts.

A social network system may maintain social graph information, which can be generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

In addition to user profile information, the social networking system may track or maintain other information about the user. For example, a geo-social networking system is a social networking system hosts one or more location-based services that record the user's location. For example, users may access the geo-social networking system using a special-purpose client application hosted by a mobile device of the user. The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. For example, social network system may post information describing a user's check-in to the user's profile page, which may cause the information to be included in newsfeeds of other users of the social networking system. In other implementations, the social networking system may add the information to such news feeds without posting it to a user profile page. The user may also add, delete or update events that the user is associated with. For example, a user may update a social event associated with a time and date that the user is planning to attend, or make comments in his wall-posts about a past event he attended.

Additionally, social networking system may provide various communication channels for users to interact with each other. In addition, other communications channels not intermediated or facilitated by the social networking system also allow users to interact. Thus, users of a social networking system may interact with each other by sending and receiving content items of various types of media through the communication channels. In particular embodiments, communication channels may include, but are not limited to, email, instant messaging (IM), text, voice or video chat, and wall posts. A user of the social networking system may also interact through various communication channels outside the social networking system with another person (a user or non-user of the social networking system). Examples of those communication channels are phone call though public switched telephone network (PSTN) or the Internet (e.g., VOIP or voice over internet protocol), text, voice or video chat, SMS (short message service) text messaging, instant messaging, and email. To keep track of communication channel information, a user of the social networking system may keep one or more address books. An address book may contain one or more contacts (e.g., a person or a business identify) and for each contact, communication channel information for the contact (e.g., a phone number, a user ID for an IM service, an email address, a user ID for a social networking system, home address, etc.). A user of the social networking system may keep the one or more address books inside or outside the social networking system. For example, the social networking system may maintain an address book for a user, and the user can access the address book though the social networking system's web site, or through a client application hosted by a client device 122. For example, a user may keep an address book in a client application hosted by the user's personal computer (e.g., Microsoft Outlook) or keep an address book in a native address book application supported by the user's mobile phone. For example, a user may keep an address book hosted over the Internet by a remote server (i.e., the address book is hosted "in the cloud") and access the address book via a web browser on a client device 122. In other implementations, an address book database may be synchronized between the client device 122 and the social network system.

FIG. 1 illustrates an example social networking system. In particular embodiments, the social networking system may store user profile data and social graph information in user profile database 101. In particular embodiments, the social networking system may store user event data in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, user profile database 101 may store communication channel information and an address book of a user. The address book, in one implementation, may be a superset or a subset of the users of the social networking system that a user has established a friend or contact relationship. A user of client device 122 may access this address book information using a special purpose or general purpose client application to view contact information. In particular embodiments, the address book may contain one or more contacts (e.g. a person or an business entity), and communication channel information for each contact (e.g., a phone number, a user ID for an IM service, an email address, a user ID for a social networking system, home address, etc.). For at least a portion of the address book information, the contact entries may be dynamic in that the contact entry is associated with a user of the social networking system that maintains his or her own account and corresponding user profile with contact information. Accordingly, when a first user changes any aspect of contact information, the revised contact information may be provided to requesting users. In particular embodiments, a user may access the address book, look up and connect to a contact through a communication channel. Ordinarily, when a person looks up a contact, the address book (e.g., Microsoft Outlook) displays communication channels of the contact in a pre-set sequence, e.g., work phone number first followed by home phone number, mobile phone number, work email address, home email address, etc. However, the pre-set order may not be most relevant as a person may have different preferred communication channels for connecting different contacts. For example, John may always connect with his parents by calling his parent's home phone number, but may primarily connect with his college friend Nick by email. In addition, while a target user may be comfortable providing an email address to many or most contacts, he or she may be uncomfortable providing a phone number or receiving a phone call on the target user's cell phone from such contacts. Particular embodiments below describe methods in providing communication channels in a preferred order based on social proximity between a target and requesting user and communication history.

Figure 2:
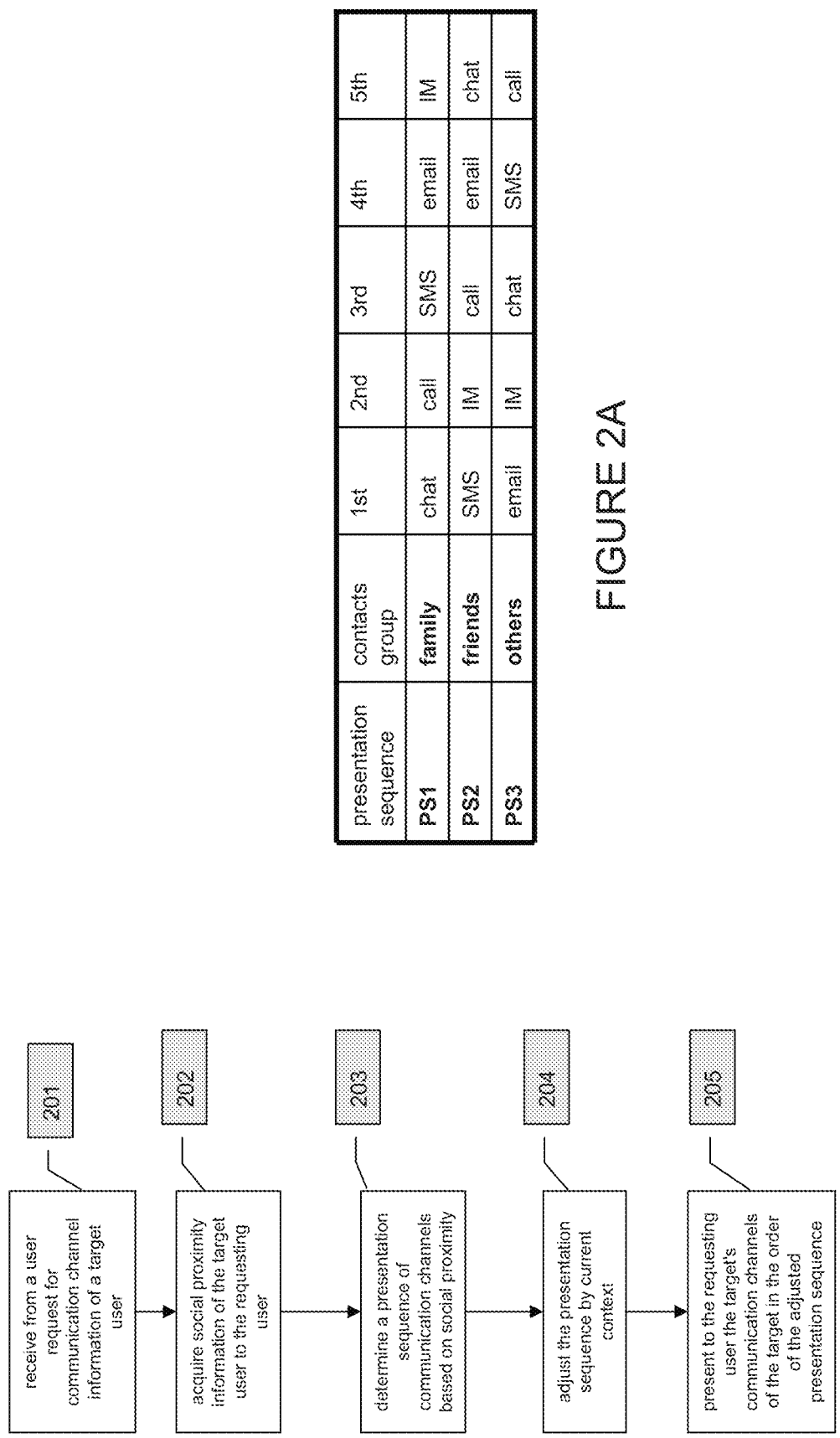
FIG. 2 illustrates an example method of ranking communication channels based on social proximity and communication history.

FIG. 2 illustrates an example method of ranking communication channels based on social proximity and communication history. FIG. 2 can be implemented by a channel-listing process hosted on one or more computing devices of the social networking system. In particular embodiments, the social networking system may store an address book of a user in user profile database 101. In particular embodiments, the address book may comprise one or more contacts. In particular embodiments, each contact of the one or more contacts in the address book may comprise a name and communication channel information. In particular embodiments, the name of a contact in the address book may be a name and/or a user ID of the social networking system. In one embodiment, the communication channel information in the address book may comprise one or more communication channel data, wherein each communication channel data comprise a communication channel type identifier (e.g., email, work phone number, etc.) and a value of the communication channel type identifier (e.g., joe@yahoo.com, 650.555.1212, etc.). In particular embodiments, the channel-listing process may receive a request from a user to look up communication channel information of a target user in the user's address book or in relation to a general search for the user's contact information (201). For example, a user can access the social networking system via a web-browser or special purpose client application, causing the channel-listing process to look up information associated with a contact stored in an address book stored in user profile database 101. For example, a user can access the social networking system on a client application hosted by the user's client device 122, causing the channel-listing process to look up information associated with a contact stored in an address book stored in user profile database 101.

Ordinarily, when a person looks up a contact in an address book (e.g., a native address book on a mobile phone), the address book can present communication channels of the contact in a static or pre-set presentation sequence (e.g., phone number, followed by email address, IM user ID, etc.), no matter how the contact is related to the user. In particular embodiments, the channel-listing process may establish one or more presentation sequences for a user by assigning each contact in the user's address book stored in user profile database 101 to one of the one or more presentation sequences. In particular embodiments, a presentation sequence may comprise an ordered list of communication channel types. In addition, not all communication channel types may be provided to a requesting user. For example, social proximity between a target and requesting user may determine which and how many communication channel types a requesting user is provided. In particular embodiments, the channel-listing process may display communication channels of a user's contact in the order of a presentation sequence the contact is assigned to. For example, a presentation sequence of a contact can be an ordered list of (chat, call, SMS, email, IM), and the social networking system can display communication channels of the contact in an ordered list of (chat, call, SMS, email, IM) or (user_ID, phone_number, mobile_phone number, email_address, user_ID).

In particular embodiments, the channel-listing process may establish one or more presentation sequences for a target user based on social proximity, by assigning one or more contacts of the same or similar social proximity to the user to a same presentation sequence. FIG. 2A illustrates an example of presentation sequences based on social proximity (i.e., whether a contact is a family member, a friend, or someone other than a family member or a friend). As FIG. 2A illustrates, the social proximity between the target user and the requesting user determines the order of the contact channels and, in some implementations, whether a given contact channel will be provided, displayed or otherwise made available. For example, in some implementations, the channel-listing process only returns a top-ranked channel to a requesting user, such as a target user's email address if the requesting user qualifies as neither a friend or family. In particular embodiments, the channel-listing process may acquire information characterizing the social proximity of the target user to the requesting user (202). In particular embodiments, the channel-listing process may access social graph information in user profile database 101 and determine social proximity of the target user to the requesting user based on a degree of separation identified in a social graph (e.g., whether the target user is a friend of the requesting user, or the target user is a friend of a friend of the requesting user, etc.). Social proximity may also be determined based on declared relationships between users, such as whether two users are married, siblings, cousins, and the like. In particular embodiments, the channel-listing process may determine an affiliation coefficient of the target user based on social proximity between the target user and the requesting user, as well as one or more observed interactions between the target user and the requesting user. For example, the channel-listing process can assign an affiliation coefficient of 1.0 if the target user is the requesting user's parent, or an affiliation coefficient of 0.9 if the target user frequently communicates with the requesting user, or an affiliation coefficient of 0.7 if the target user is a friend of friend of the requesting user, and the target user and the requesting user went to the same college at the same time. A system for measuring user affinity is described more generally in U.S. patent application Ser. No. 11/503,093, filed on Aug. 11, 2006, which is hereby incorporated by reference in its entirety and for all purposes. Still further, as discussed above, group users by social proximity can be based on degrees of separation in a social graph, observed activities between users, explicitly defined relationship types between users (e.g., "married to," "in a relationship with," "brother of," "son of," etc."), and combinations of the foregoing factors or attributes. In some implementations, social proximity can also be a matter of explicit configuration by a subject user.

In particular embodiments, the channel-listing process may determine a presentation sequence for the target user based on social proximity between the target user and the requesting user (203). FIG. 2A illustrates presentation sequences for different user groups that are based on degrees of social proximity to the user. For the example of FIG. 2A, the channel-listing process receives a request from a user to look up communication channel information of a target user in the user's address book. If a target user is a family member of a requesting user, then the channel-listing process can present the target user's communication channels to the requesting user in an order of (chat, call, SMS, email, IM). In the example of FIG. 2A, if a target user is a friend of a requesting user, then the channel-listing process can present the target user's communication channels to the requesting user in an order of (SMS, IM, call, email, chat). In the example of FIG. 2A, if a target user is not a family member or a friend of a requesting user (e.g., a co-worker), then the channel-listing process can present the target user's communication channels to the requesting user in an order of (email, IM, chat, SMS, call) or, only (email) if only one communication channel is allowed). In some implementations, only the top-ranked or top N (where N is less than all available communications channels) are presented to the requesting user. In this manner, the channel-listing process suggests or recommends a communications channel to a requesting user that indicates a preferred way to reach the target user.

In particular embodiments, the channel-listing process may adjust a presentation sequence by current context (204). For example, a user requests to look up a contact in the address book stored in user profile database 101 and the presentation sequence for the contact is (call, chat, email, SMS, IM). If the channel-listing process determines that the contact is currently logged into the social networking system but is in a meeting (by accessing event database 102 or a calendar system), the channel listing process can adjust the presentation sequence to (chat, email, SMS, call, IM) so that the user communication will not interrupt the target user's current activity.

Figure 4:
FIG. 4 illustrates an example of presenting a contact's communication channels in the order of the adjusted presentation sequence.

In particular embodiments, the channel-listing process may present to the requesting user the target user's communication channels in the order of the adjusted presentation sequence (205). FIG. 4 illustrates an example of presenting a contact's communication channels in the order of the adjusted presentation sequence. In particular embodiments, the channel-listing process may present to the requesting user the target user's communication channels in the order of the adjusted presentation sequence in a graphic user interface (GUI) of a client application hosted by the requesting user's client device 122 (e.g., a mobile phone). In particular embodiments, each communication channel in the GUI is represented by an icon. In particular embodiments, an action on an icon by the requesting user may cause the client application to initiate a connection to the requesting user by the communication channel associated with the icon. For example, the requesting user can finger tap on a phone icon, double click on a phone icon by a pointer, or drag a phone icon to the requesting user's picture in the GUI in FIG. 4, causing the client application on the mobile phone to initiate a call to the target user. In other implementations, a client application hosted on a user's client device 122 may automatically launch a communications application that corresponds to the top-ranked communications channel to initiate a communications session with the target user.

In one implementation, a user may configure one or more rules that define presentation sequences for various users specifically or social proximity groups. For example, the user may configure a set of preferences for different groups of users that resembles FIGS. 2A. The set of preferences can be considered default settings that may be adjusted based on current context, as well as observed communication history. In particular embodiments, the channel-listing process can further update the one or more presentation sequences for a user by taking into account the user's explicitly configured preferences and communication history relative to one or more users or groups of users. In particular embodiments, the channel-listing process may access communication history data of a user in user profile database 101. In particular embodiments, a user's communication history may comprise frequency information for each communication channel in the inbound and/or outbound directions with each contact in the user's address book, as well as other individuals within and/or outside the social network. For example, a user's communication history can store information such as the number of emails sent/received between one or more contacts/social proximity groups (e.g., family, friends, second-degree friends, etc.), the number of text messages sent/received between one or more contacts/social proximity groups, the number of phone calls sent/received between one or more contacts/social proximity groups, and the like. In some implementations, the client device 122, such as a mobile device may be configured to periodically upload log data that can be processed by the social networking system to generate this information. In some implementations, the communication history data may be raw or log data that is processed to yield these statistics. In other implementations, a data mining process may periodically analyze the log data and maintain the above-identified counts over various slide time intervals. In some implementations, a local process executing on the client device 122 can process this information and generate statistical data for use by the social networking system. In particular embodiments, a connection between a user and another person may cause updates to the user's communication history accordingly. For example, a user can look up a contact in the user's address book by accessing a client application hosted on the user's mobile phone, call the contact by a phone number listed in the address book, and the client application updates the user's communication history for the contact accordingly (e.g., incrementing outbound call frequency for the contact/social proximity group by 1). For example, a user may receive an SMS text message from a contact on a client application hosted by the user's mobile phone, and the client application can update the user's communication history for the contact accordingly (e.g., incrementing inbound SMS frequency for the contact by 1).

In particular embodiments, the channel-listing process may update a presentation sequence for a user based on inbound and outbound communication history between the user and one or more contacts assigned to the proximity group. The updating process may consider, for a given social proximity group, the relative frequencies (in the inbound and/or outbound directions) that the different communications channels are used by a given user or in connection with users in the proximity group. In particular embodiments, the channel-listing process may adjust a presentation sequence for a user based on inbound and outbound communication history between the user and one or more contacts assigned to the proximity group by calculating, for each communication channel in a presentation sequence, a weighted average of a default score, inbound communication history, and outbound communication history of the communication channel, and re-ordering the presentation sequence by the calculated weighted average of each communication channel in the presentation sequence.

FIG. 3 illustrates an example table showing data values that may be used for updating a presentation sequence based on inbound and outbound communication history. In the example of FIG. 3, the channel-listing process can establish a presentation sequence (PS1) for a first user or proximity group (301), and assign default scores for communication channels in the presentation sequence, with the communication channel on the top of the sequence having the highest score (e.g., 1.0 for chat, 0.8 for call, etc.). The default scores may be based on global defaults or may be based on a presentation sequence explicitly configured by the subject user. In some implementations, a user may also explicitly configure one or more communications channels from appearing in a presentation sequence for one or more users or proximity groups. For example, a user may configure the system to only allow the user's cell phone number to appear in presentation sequences for select users or a "family" proximity group. The channel-listing process can also record communication history between the first user and one or more users assigned to the presentation sequence and/or the proximity group. For example, for outbound communication between the first user and the one or more users assigned to the presentation sequence, 10% of the outbound communication is chat, 45% is call, 5% is SMS, 40% is email and 0% is IM. For example, for inbound communication, 10% of the inbound communication is chat, 55% is call, 5% is SMS, 30% is email and 0% is IM. The channel-listing process can assign weighting factors to the default score, outbound communication and inbound communication (0.5 for default score, 0.3 for outbound communication, and 0.2 for inbound communication), and calculate a weighted average for each communication channel. Using "call" in FIG. 3 as an example, weighted average for call is:

$$(0.8*0.5+45\%*0.3+55\%*0.2)/3=0.65$$

The channel-listing process can re-order communication channels of the presentation sequence PS1 by the calculated weighted average of each communication channel (302). Accordingly, the channel listing process can operate to adjust the presentation sequence corresponding to one or more users or proximity groups based on observed communications habits of the users.

As a user of the social networking system can keep one or more address books outside the social networking system, in additional to the address book stored in user profile database 101, it may be more efficient (e.g., to reduce network traffic between the social networking system and a remote device) to store a local copy of presentation sequences with each address book outside the social networking system. In particular embodiments, the channel-listing process may store a local copy of presentation sequences in a user's client device 122. In one embodiment, the channel-listing process may store a local copy of presentation history and a local copy of communication history, in a storage device of a user's client device 122 (e.g., a microSD flash memory card in a mobile phone). In particular embodiments, the channel-listing process may store a local copy of presentation sequences in a server hosting a user's address book. In one embodiment, the channel-listing process may store a local copy of presentation sequences and a local copy of communication history, in a storage device (e.g., a hard disk drive) of a server hosting a user's address book, or in a storage device linked to a server hosting a user's address book. In particular embodiments, a connection between a user and another person may cause an update to a local copy of presentation history. For example, a user may receive an SMS text message from a contact on a client application hosted by the user's mobile phone, and the client application can cause the channel-listing process to update the locally stored communication history, and update corresponding presentation sequence locally if needed. For example, a server hosting a user's address book can facilitate a chat session between the user and a contact, causing the channel-listing process to update the locally stored communication history, and update corresponding presentation sequence locally if needed. In particular embodiments, the channel-listing process may present communication channels of a contact in a user's address book as sorted by one of the locally stored presentation sequences.

In particular embodiments, the channel-listing process may synchronize one or more local copies of presentation sequences with the presentation sequences stored in user profile database 101. For example, the channel-listing process can poll a local copy of presentation sequences in a user's mobile phone every Monday at 3 AM, determine changes in the local copy and changes in the presentation sequences stored in user profile database 101, and update the local copy and the presentation sequences stored in user profile database 101 if needed.

As discussed above, implementations of the invention can also be used to select the top-ranked communications channel when a requesting user requests contact information for a target user. For example, a requesting user, using client device 122 may access the social networking system and see an identifier of a target user. The requesting user, desiring to contact the user, may access an icon or other control to cause the client device 122 to initiate a communications session with the target user. In some implementations, the social networking system may execute the channel listing process to identify a communications channel and provide the selected communications channel and channel information to a client device 122, which may use the information to initiate a communications session with the target user.

Figure 5:
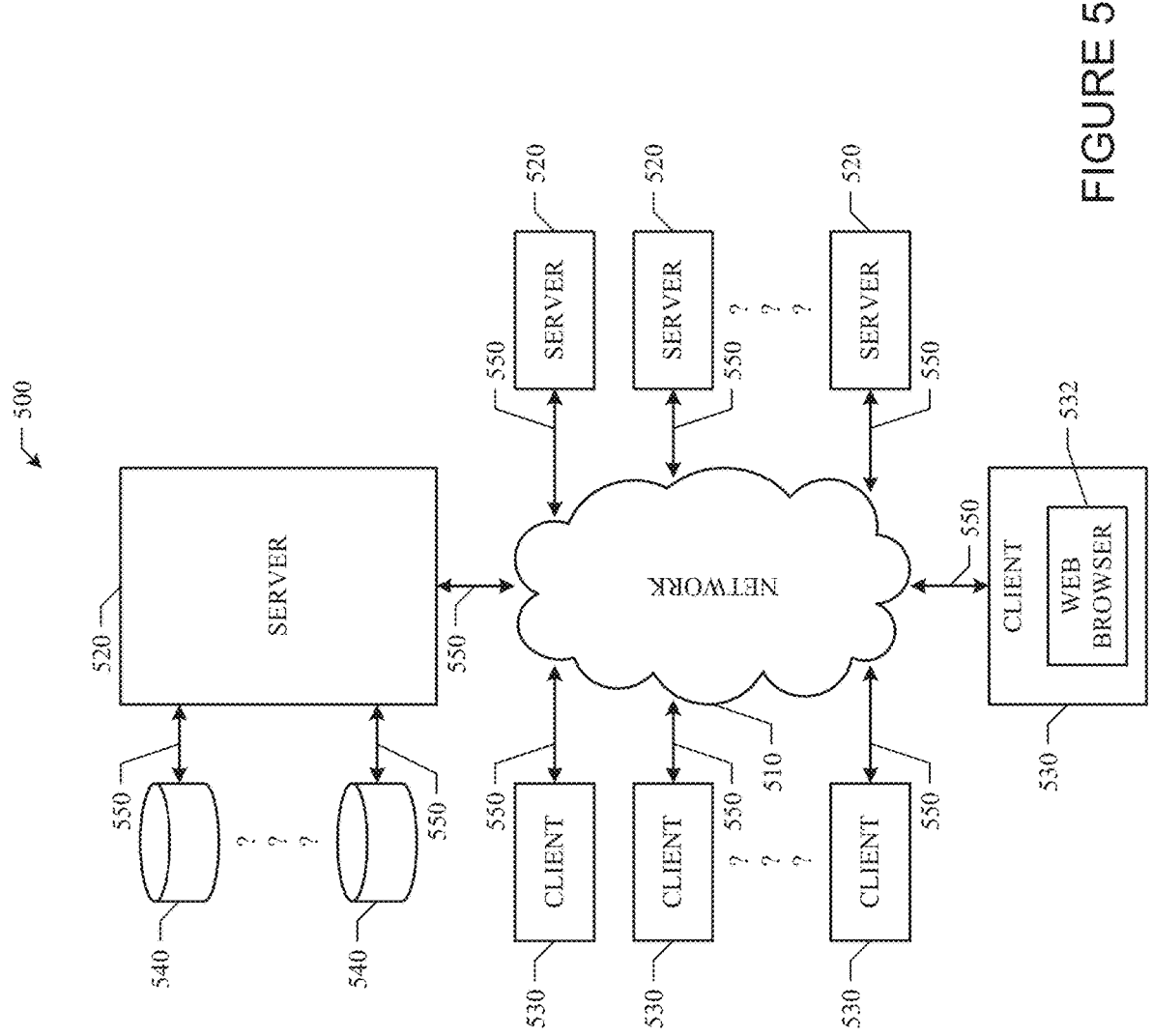
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more data storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
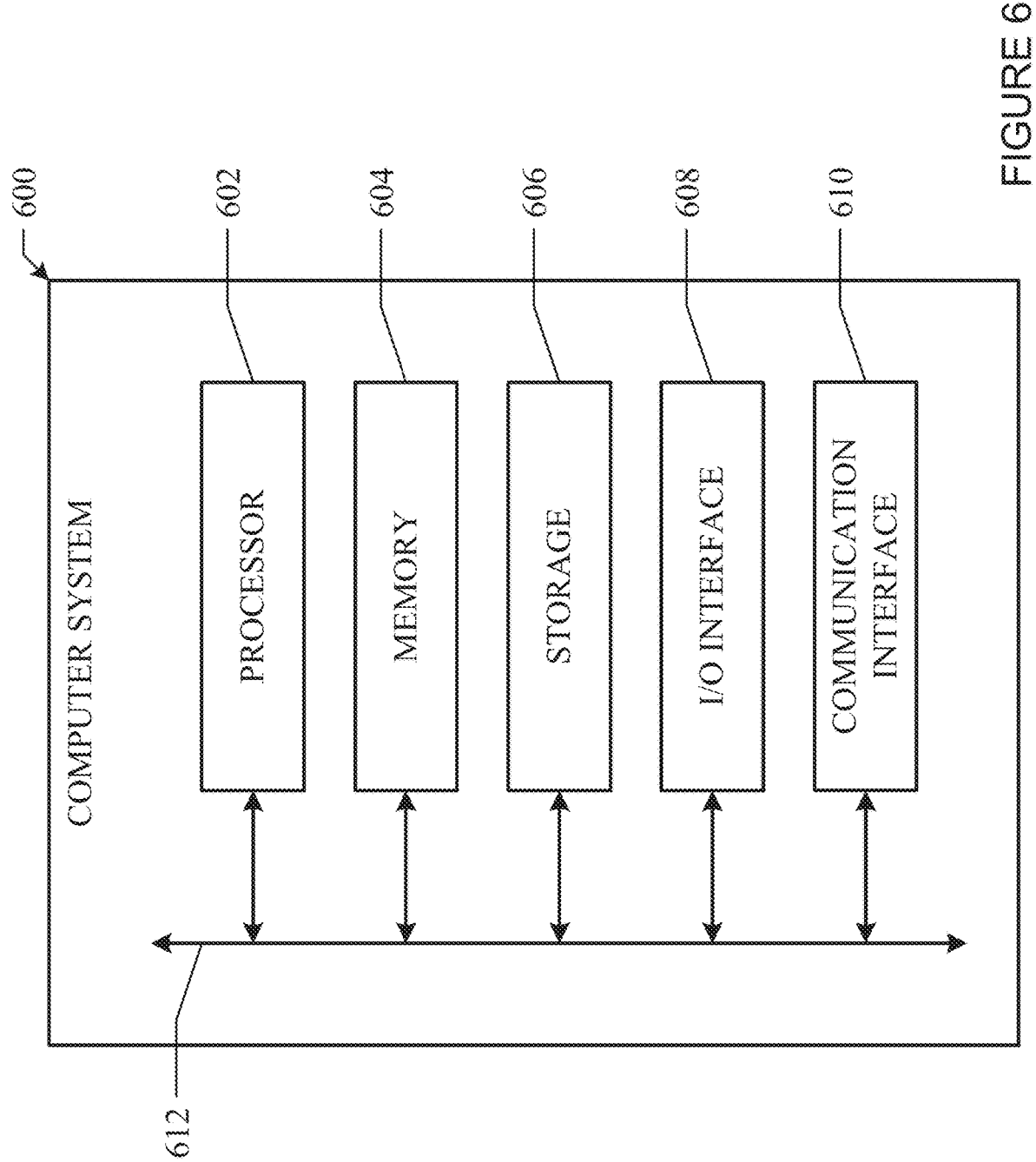
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method comprising, by a client device:
   sending, to a computing device, a request from a first user for communication-channel information associated with a second user; and
   receiving, from the computing device, one or more user-selectable elements corresponding to each communication channel of a plurality of communication channels, wherein the plurality of communication channels are determined based on an affiliation coefficient between the first user and the second user, wherein each communication channel is associated with a score calculated based on a social proximity between the first user and the second user, and wherein the one or more user-selectable elements corresponding to each communication channel of the plurality of communication channels are presented in an order ranked based on the respective score associated with the communication channel.

2. The method of claim 1, wherein the score is calculated further based on communication-history information associated with one or more affiliation groups, wherein each of the one or more affiliation groups comprises one or more other users, and wherein the one or more affiliation groups are generated based on one or more affiliation coefficients between the other users and the second user.

3. The method of claim 2, further comprising:
receiving, at the client device, one or more rules configured by the first user, wherein one or more of the rules comprise a preference of the first user for one or more of the communication channels in relation to one or more of the affiliation groups.

4. The method of claim 3, wherein the score associated with each communication channel is calculated further based on one or more of the rules.

5. The method of claim 1, wherein the affiliation coefficient between the first user and the second user is determined based on a degree of separation from the first user to the second user according to social-graph information of the first user.

6. The method of claim 1, wherein the ranked order is further based on a current context of one or more of the first user or the second user.

7. The method of claim 1, wherein the ranked communication channels comprise one or more top-ranked communication channels.

8. The method of claim 7, further comprising:
receiving, from the computing device, information identifying only one or more of the user-selectable elements associated with each of one or more of the top-ranked communication channels.

9. The method of claim 1, further comprising:
receiving, at the computing device, one or more rules configured by the first user, wherein one or more of the rules comprises a preference of the first user for one or more of the communication channels in relation to the second user.

10. The method of claim 9, wherein the score associated with each communication channel is calculated further based on one or more of the rules.

11. The method of claim 1, wherein one or more of the calculated scores comprise, for each respective communication channel, a weighted average of communication history and a default score associated with the communication channel, wherein the communication history comprises inbound and outbound communication history.

12. A system comprising:
one or more processors; and
a memory coupled to the processors comprising instructions executable by the processors, the processors being operable when executing the instructions to:
send, to a computing device, a request from a first user for communication-channel information associated with a second user; and
receive, from the computing device, one or more user-selectable elements corresponding to each communication channel of a plurality of communication channels, wherein the plurality of communication channels are determined based on an affiliation coefficient between the first user and the second user, wherein each communication channel is associated with a score calculated based on a social proximity between the first user and the second user, and wherein the one or more user-selectable elements corresponding to each communication channel of the plurality of communication channels are presented in an order ranked based on the respective score associated with the communication channel.

13. The system of claim 12, wherein the score is calculated further based on communication-history information associated with one or more affiliation groups, wherein each of the one or more affiliation groups comprises one or more other users, and wherein the one or more affiliation groups are generated based on one or more affiliation coefficients between the other users and the second user.

14. The system of claim 13, wherein the processors are further operable when executing the instructions to:
receive, at the client device, one or more rules configured by the first user, wherein one or more of the rules comprise a preference of the first user for one or more of the communication channels in relation to one or more of the affiliation groups.

15. The system of claim 14, wherein the score associated with each communication channel is calculated further based on one or more of the rules.

16. The system of claim 12, wherein the affiliation coefficient between the first user and the second user is determined based on a degree of separation from the first user to the second user according to social-graph information of the first user.

17. The system of claim 12, wherein the ranked order is further based on a current context of one or more of the first user or the second user.

18. The system of claim 12, wherein the ranked communication channels comprise one or more top-ranked communication channels.

19. The system of claim 18, wherein the processors are further operable when executing the instructions to:
receive, from the computing device, information identifying only one or more of the user-selectable elements associated with each of one or more of the top-ranked communication channels.

20. One or more computer-readable non-transitory storage media embodying software that is operable when executed to:
send, to a computing device, a request from a first user for communication-channel information associated with a second user; and
receive, from the computing device, one or more user-selectable elements corresponding to each communication channel of a plurality of communication channels, wherein the plurality of communication channels are determined based on an affiliation coefficient between the first user and the second user, wherein each communication channel is associated with a score calculated based on a social proximity between the first user and the second user, and wherein the one or more user-selectable elements corresponding to each communication channel of the plurality of communication channels are presented in an order ranked based on the respective score associated with the communication channel.

* * * * *